Aug. 26, 1952 — S. M. DUNN — 2,608,204
VALVE
Filed Aug. 13, 1945 — 2 SHEETS—SHEET 1

INVENTOR.
BY STEPHEN M. DUNN
Hazard & Miller
Attorneys

Aug. 26, 1952  S. M. DUNN  2,608,204
VALVE

Filed Aug. 13, 1945  2 SHEETS—SHEET 2

INVENTOR.
BY Stephen M. Dunn
Hazard & Miller
Attorneys

Patented Aug. 26, 1952

2,608,204

UNITED STATES PATENT OFFICE 2,608,204

VALVE

Stephen M. Dunn, Los Angeles, Calif.

Application August 13, 1945, Serial No. 610,586

1 Claim. (Cl. 137—220)

This invention relates to improvements in valves and may be regarded as an improvement over the valve device disclosed in my prior United States Patent No. 2,247,363, issued July 1, 1941.

In valves of this character the closure member consists of a flexible tubular sleeve which may be generally cylindrical or of a truncated conical shape which is made of resilient material, such as natural rubber or rubber-like synthetic material. The sleeve is ordinarily made of such shape and dimensions that so long as fluid pressure in the control chamber or space surrounding the sleeve is equal to or greater than the pressure inside of the sleeve or about the core the sleeve will remain in sealing contact with the core member and the valve will remain in closed condition. In opening such valves it is necessary to reduce the pressure in the control chamber or space surrounding the sleeve to some value less than the pressure within the sleeve adjacent the core so as to thus create a pressure differential which is effective on the sleeve to distend it or expand it away from the core to the shape assumed when the valve is opened. The amount of pressure differential required to open the valve fully is that which is sufficient to overcome the elastic tension generated in the sleeve as it is distended or expanded, and is therefore proportional to the amount by which the sleeve is stretched in changing from the slack or contracted condition around the core to the fully extended or expanded shape assumed when the valve is fully opened. In valves of this character as conventionally constructed the amount by which the sleeve is stretched when in its fully open position or fully distended shape may be from 15% to 20% of the circumferential dimension of the sleeve to as much as 40% of this dimension depending upon the design and general proportions of the valve and on whether the valve is designed to provide a port area when fully opened that will be equal to the internal cross-sectional area of the pipes or conduits leading to and from the valve.

In some installations or applications the pressure differential required to open the valve is created by merely venting the fluid pressure in the control chamber or space surrounding the sleeve to atmosphere but where the valve is controlling the flow of noxious or inflammable fluids it is not feasible to vent fluid from the control chamber in this manner and it then becomes necessary to exhaust or vent fluid pressure from the control chamber into the outlet pipe which leads from the valve. Whenever valves in such applications are open the sleeve will only be distended or expanded until the pressure differential acting thereon equals the pressure loss through the valve. This characteristic becomes quite serious in valves which have relatively thick sleeves designed for high pressure service requiring relatively high pressure differentials in order to fully expand them. It furthermore constitutes a serious limitation to the more general application of valves of this type because of the loss of pressure of the fluid flowing through the vide an improved valve of this type in which the valve.

An object of the present invention is to pro- amount of stretch engendered by the change of shape of the sleeve from its fully closed condition to its fully open condition will be greatly reduced, thus reducing the pressure differential required to fully open the valve and in turn reducing the pressure loss through the valve.

Another object of the invention is to provide a valve in which the sleeve may be distended fully without exhausting or venting the fluid pressure in the control chamber or space surrounding the sleeve to atmosphere.

Another object of the invention is to provide a valve of this character wherein the use of external control piping may be greatly reduced.

Still another object of the invention is to provide a valve which will not slam or flutter in closing and in which the rate of opening may be readily controlled, and to provide a valve of this character in which the port area when the valve is in fully open condition will not be less than the area of the pipes or conduits leading thereto and therefrom.

Still another object of the invention is to provide a valve having a flexible sleeve therein that is contractible about a core, the core having a movable portion that is movable axially with respect to the contractible and distendable sleeve.

With the foregoing and other objects in view, which will be made manifest in the following detailed description and specifically pointed out in the appended claim, reference is had to the accompanying drawings for illustrative embodiments of the invention, wherein:

Figure 1:
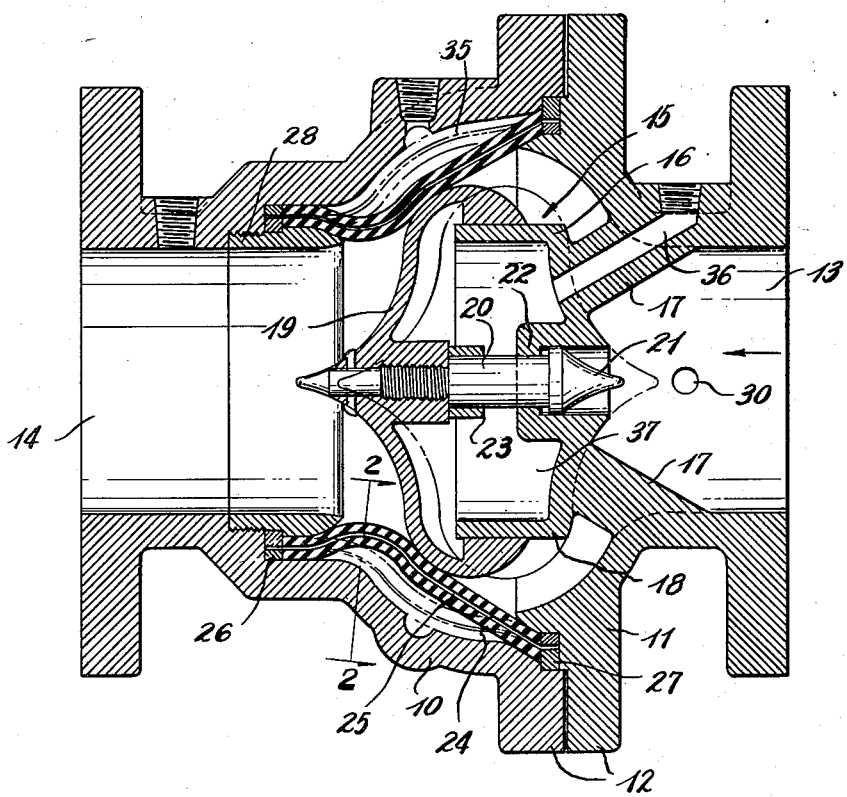
Figure 1 is a longitudinal vertical section through one form of valve embodying the present invention.
Figures 2, 3:
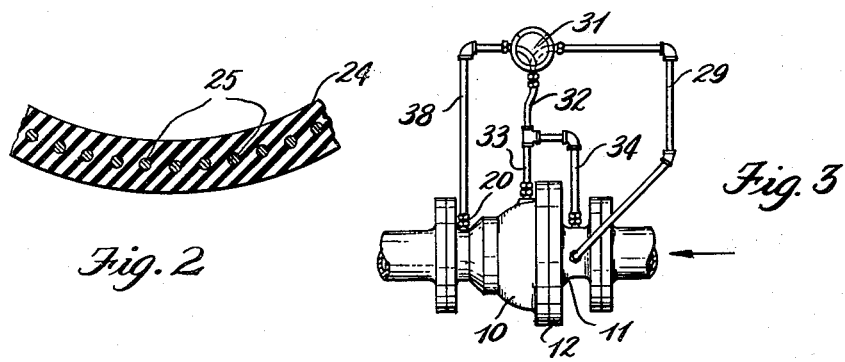
Fig. 2 is a sectional view through a portion of the sleeve and may be regarded as having been taken substantially upon the line 2—2 on Fig. 1.
Fig. 3 is a view in side elevation of the valve illustrated in Fig. 1 and illustrating the control piping schematically applied thereto.

Referring to the accompanying drawings wherein similar reference characters designate similar parts throughout, and referring particularly to Figs. 1 to 3, the valve illustrated in these figures consists of a two-part body composed of parts 10 and 11 attachable to each other by companion flanges 12. The body formed by these parts has an inlet 13 and an outlet 14. Within the body there is supported a two-part core, generally indicated at 15 having a stationary part 16 that may be integral with the body part 11 and supported centrally thereof by arms or webs 17. This stationary part has a cylindrical external surface 18 over which the movable part 19 of the core 15 is telescopically slidable. The movable part is somewhat turnip-shaped in form and has secured thereto an axial stem 20 equipped with a head 21 that is slidable into a counterbore in the center of the stationary part 1 of the core. The head 21 on engagement with the bottom 22 of the counterbore limits the axial movement of the movable part of the core 19 in one direction and in a similar manner, shoulder 23 which is on the stem and which is engageable with the stationary part 16 of the core will limit movement of the movable part 19 in the opposite direction. A frusto-conical sleeve 24 is provided which is flexible and is preferably formed of rubber or a rubber-like synthetic material. In the preferred form of construction this tapered sleeve is of substantially uniform wall thickness and has embedded therein longitudinally extending wire, cord or fabric ligaments 25, the ends of which are secured or retained in anchor rings 26 and 27. The anchor ring 26 may be retained against a seat in the body part 10 by a threaded retaining ring 28 and the anchor ring 27 is adapted to be clamped between the body parts 10 and 11 adjacent the companion flanges 12.

Referring particularly to Fig. 3, conduit 29 may be connected to an aperture 30 in the inlet 13 for transmitting upstream pressure from the inlet 13 to a three-way valve 31. Valve 31 leads to a conduit 32 which has branched conduits 33 and 34. Conduit 33 leads to the control chamber 35 or the space surrounding the sleeve 24 between the sleeve and the body part 10. Conduit 34 leads to a passage 36 formed in one of the webs or arms 17 and this passage in turn leads to the space or chamber 37 between the parts of the core 15. The three-way valve 31 also leads to a vent pipe 38 that is connected to the downstream side or outlet 14 of the valve.

The operation of the above-described construction is as follows: When the three-way or control valve 31 is manipulated to establish communication between conduits 29 and 32, upstream pressure will be transmitted simultaneously to the control chamber 35 and to chamber 37. The pressure transmitted to the control chamber will equalize pressures on opposite sides of the flexible sleeve 24 so that it may assume a position tending to contract about the core. The pressure that is transmitted to the interior of the core 15 is effective to move the movable turnip-shaped core part 19 in an axial direction toward the outlet 14 and such movement together with the inward movement of the sleeve will bring the core and sleeve into contact with each other. If the control valve 31 is manipulated so as to connect conduit 32 with the vent pipe 38, chambers 35 and 37 are both connected with the downstream side of the valve, and the valve thus caused to open. Under these circumstances, pressure in the control chamber 35 is reduced allowing the sleeve to be expanded by the inlet pressure that is effective on the interior surface of the sleeve and the movable core part 19 is shifted into its open position toward the inlet 13 by the pressure effective on the exterior of the core part.

By means of this construction it will be appreciated that movement of the sleeve from its fully open to its fully closed position is greatly reduced and consequently, no great stretch of the sleeve is required in passing from one extreme position to the other. At the same time, when the valve is fully open an adequate space is present between the movable core part 19 and the sleeve 24 to permit of all incoming flow to pass around the core with a minimum friction loss. By reducing the stretch of the sleeve in passing from one extreme position to the other, the life of the sleeve may be materially prolonged and when occasion demands the sleeve may be made quite heavy or with a thick wall without involving a high friction loss through the valve. Under certain circumstances, the vent pipe 38 may be connected to atmosphere and may merely discharge liquid or other fluid from the chambers 35 and 37 externally of the pipeline in which the valve may be incorporated. However, if the fluid passing through the pipeline is of a noxious or inflammable character or if it is otherwise undesirable to release fluid from chambers 35 and 37 the present construction enables the released fluid to be returned to the pipeline through the vent pipe 38. It will be noted that in this construction the head of fluid passing through the valve is utilized to effect its operation.

Figure 4:
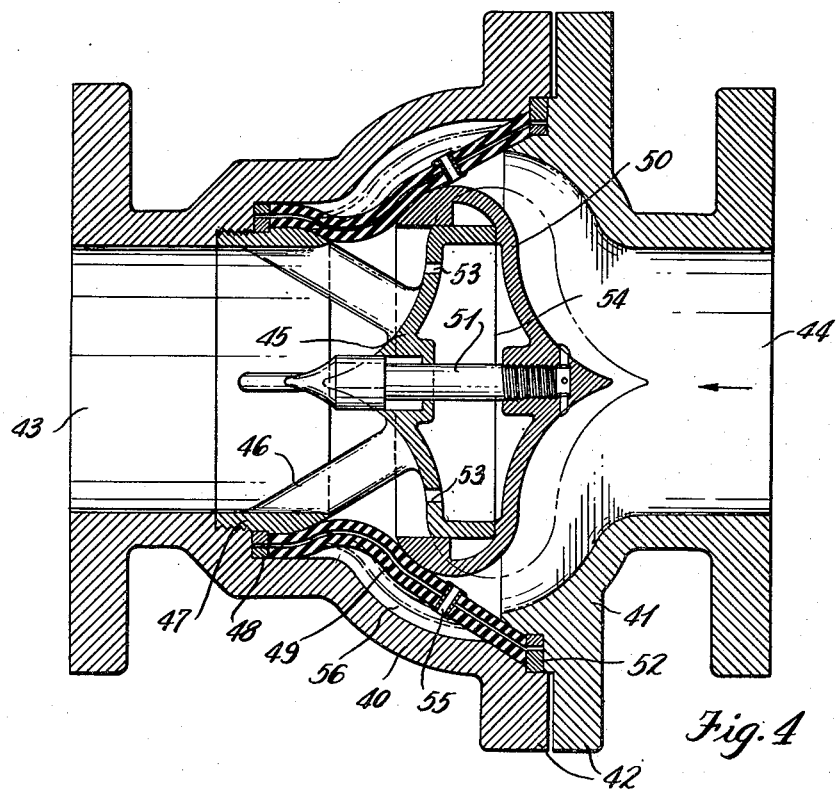
Fig. 4 is a view similar to Fig. 1, illustrating an alternative form of construction intended particularly for application as a check valve.

In Fig. 4, I have illustrated an alternative form of construction which may be advantageously used as a check valve. Therein, the body is composed of two parts 40 and 41 connectible by companion flanges 42. In this form of construction the inlet will normally be at 43 and the outlet at 44. The stationary part of the core is indicated at 45 and is supported by arms 46 that may be integral with the retaining ring 47 that clamps one of the anchor rings 48 on the sleeve 49 in place within the body. The movable part of the core which is turnip-shaped is indicated at 50 and is equipped with the headed stem 51. The sleeve 49 has an anchor ring 52 that is clamped between the parts of the body to fasten the sleeve in position therein. In this form of construction the stationary part of the core has one or more apertures 53 formed therein for transmitting inlet pressure to the chamber 54. The sleeve has one or more apertures that are preferably lined by grommets 55 and which are exposed to the pressure in the outlet 44. In this form of construction when flow commences in the direction from inlet 43 toward outlet 44, fluid under inlet pressure will enter chamber 54 through apertures 53 and movable part of core 50 will be forced toward outlet 44 and out of contact with sleeve 49 until stopped by headed stem 51. Also, since control chamber 56 is in communication with outlet 44 through grommets 55, while the inner surface of sleeve 49 is exposed to the fluid pressure in inlet 43 and is also exposed to the reaction pressure incident to the change in direction of flow of fluid as it passes around stationary core 45 and movable core 50, sleeve 49 will be expanded into contact with body part 40 as shown in broken line and the fluid in control chamber 56 will escape through grommets 55 to outlet 44. Whenever the fluid pressure in outlet 44 rises above the fluid pressure in inlet 43 and reverse flow tends to take place, the difference in fluid pressure acting on the inner and outer surfaces of movable core 50 will force movable core 50 toward inlet 43 and the excess fluid contained in chamber 54 will escape to inlet 43 through apertures 53. At the same time fluid will enter control chamber 56 through grommets 55 and sleeve 49 will contract by its own elasticity until it comes into contact with movable core 50 after which it will be forced by the excess of pressure in control chamber 56 over the pressure in inlet 43 to take the form shown in full line and sealing contact will be built up between sleeve 49 and movable core 50 by the action explained in Patent No. 2,247,363.

In this form of construction, as above explained, the movement of the sleeve 49 from fully open position to fully closed position may be reduced greatly by the movement of the core part 50 axially with respect thereto. Consequently, the amount of stretch of the sleeve in shifting from fully open position to fully closed position may be greatly reduced and at the same time adequate provision is made for full flow through the valve when it is fully opened without involving severe head losses.

Figure 5:
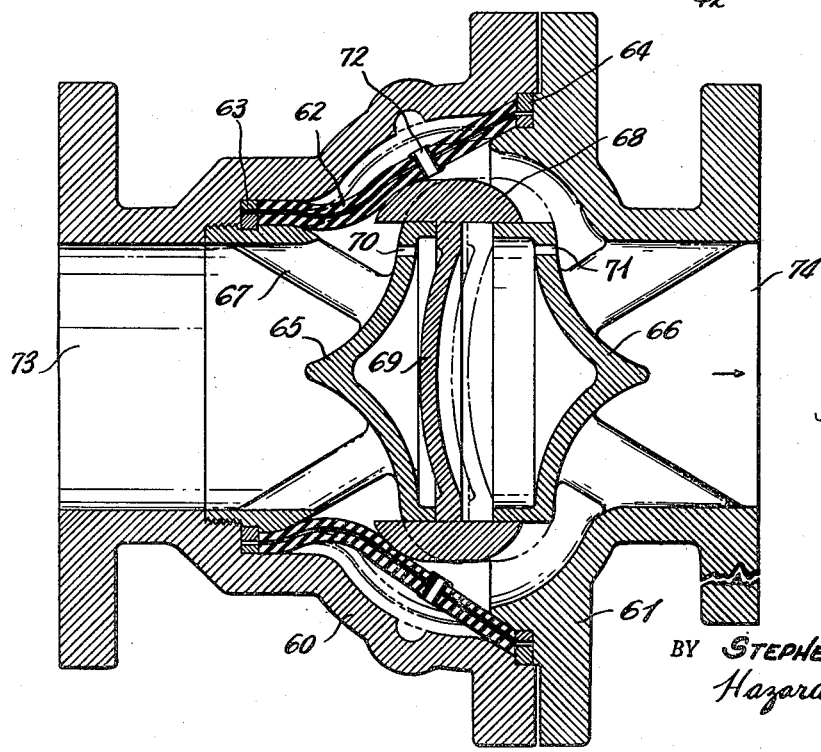
Fig. 5 is a view similar to Fig. 4 illustrating still another form of construction intended also for use as a check valve.

In Fig. 5, another type of check valve is disclosed consisting of two opposed body parts 60 and 61 having a flexible sleeve 62 retained therein by anchor rings 63 and 64 as previously explained. In this form of construction the central core has two stationary parts 65 and 66 supported centrally of the valve as by arms 67. These stationary parts of the core slidably support a movable part 68 of the core having a central diaphragm portion 69 that is movable between limits between the stationary parts 65 and 66. Both of the stationary parts have apertures therein indicated at 70 and 71 and the sleeve is equipped with grommets 72. In this form of construction if fluid is normally progressing from the inlet 73 to the outlet 74, the movable part 68 of the core is shifted into the dotted line position shown by the inlet pressure entering the core through apertures 70 and fluid on the opposite side of the diaphragm 69 escaping through apertures 71. Under these conditions, the pressures being equalized on opposite sides of the sleeve 62, the flow will expand the sleeve into its position lying against the interior of the body part 60. It will also be effective to enter apertures 70 and on the exterior surface of the movable core part 68 to move it toward the outlet 74. In the event of attempted reverse flow through the valve the core part 68 is moved to the full line position shown in Fig. 5, and pressure is transmitted through the sleeve by means of the grommet 72. This transmitted pressure being in excess of the pressure in inlet 73 to which the inner surface of sleeve 62 to the left of its line of contact with movable core 68 is exposed sleeve 62 will be forced to take the form shown in full line and sealing contact will be established by the action explained in Patent No. 2,247,363.

This form of construction may be employed where high pressures may be present and where it might be unsafe to use the check valve shown in Fig. 4, because of the possibility of the stem 51 breaking. If stem 51 should break the movable core part 50 could proceed toward the outlet 44 and would seat on the interior of the body part 42 closing the valve against flow in the normal direction. In the construction shown in Fig. 5, such action is impossible and consequently this form of check valve may be employed and preferred in certain high pressure conditions.

From the above-described constructions it will be appreciated that an improved valve is provided of the type wherein a flexible sleeve is urged by fluid pressure to contact about a core and that provision is made for reducing the amount of movement of the sleeve, and consequently the amount of its stretch by axially shifting by means of fluid pressure a portion of the core that the sleeve is designed to engage. The improved valve not only will prolong the life of the sleeve but has many attendant advantages with respect to friction losses as of flow and the like as will be appreciated by those skilled in the art.

Various changes may be made in the details of construction without departing from the spirit and scope of the invention as defined by the appended claim.

I claim:

A valve comprising a body, a distendable sleeve anchored at its ends with the body, a core disposed within the sleeve, said core having fixed and movable portions and cooperating to form a pressure chamber, said movable portion having one face subject to line pressure and an opposite face subject to chamber pressure, said movable portion being movable into and out of engagement with the sleeve in response to differences in pressure acting on its faces, means for supporting said core within the body and axially thereof, means for controlling application of fluid pressure between the sleeve and the body, and means for controlling application of fluid pressure within said pressure chamber to move said movable portion of said core against the pressure acting on its opposite face.

STEPHEN M. DUNN.

REFERENCES CITED

The following references are of record in the file of this patent:

UNITED STATES PATENTS

| Number | Name | Date |
| --- | --- | --- |
| 1,045,404 | Hottenroth | Nov. 26, 1912 |
| 1,636,662 | Larner | July 19, 1927 |
| 1,856,222 | McClellan | May 3, 1932 |
| 2,247,363 | Dunn | July 1, 1941 |
| 2,263,462 | Hunter | Nov. 18, 1941 |

FOREIGN PATENTS

| Number | Country | Date |
| --- | --- | --- |
| 558,932 | Great Britain | of 1944 |